US007176892B2

(12) United States Patent
Kobayashi

(10) Patent No.: US 7,176,892 B2
(45) Date of Patent: Feb. 13, 2007

(54) LEVER HANDLE TYPE HAPTIC INPUT APPARATUS EQUIPPED WITH ELECTROMAGNETIC BRAKE

(75) Inventor: Ayumu Kobayashi, Miyagi-ken (JP)

(73) Assignee: Alps Electric Co., Ltd., Tokyo (JP)

( * ) Notice: Subject to any disclaimer, the term of this patent is extended or adjusted under 35 U.S.C. 154(b) by 418 days.

(21) Appl. No.: 10/283,593

(22) Filed: Oct. 29, 2002

(65) Prior Publication Data

US 2003/0080939 A1 May 1, 2003

(30) Foreign Application Priority Data

Oct. 30, 2001 (JP) ............................ 2001-332822

(51) Int. Cl.
*G09G 5/08* (2006.01)
*G09G 9/047* (2006.01)
*G05B 15/00* (2006.01)
*A63F 13/00* (2006.01)

(52) U.S. Cl. .................. 345/161; 74/471 XY; 700/83; 463/38

(58) Field of Classification Search .................. 700/83, 700/85, 260, 264, 275; 345/156, 161, 184; 715/701, 702; 434/45, 445; 463/30, 38; 335/3, 38; 348/221.7, 211.7; 74/471 XY; 73/862.08, 862.17, 862.18
See application file for complete search history.

(56) References Cited

U.S. PATENT DOCUMENTS 4,652,805 A * 3/1987 Kohn ......................... 318/628
4,777,981 A * 10/1988 Petro ....................... 137/636.2
5,421,694 A * 6/1995 Baker et al. ................ 414/694
5,470,615 A * 11/1995 Sbalchiero et al. ......... 427/459
5,513,100 A * 4/1996 Parker et al. ................. 700/56
5,532,476 A * 7/1996 Mikan ........................ 250/221
5,687,080 A * 11/1997 Hoyt et al. ................... 700/85

(Continued)

FOREIGN PATENT DOCUMENTS

DE 195 01 439 9/2006

(Continued)

OTHER PUBLICATIONS

Copy of Office Action dated Jan. 27, 2006 for European Patent Application No. 02024124.6.

*Primary Examiner*—Ramesh Patel
*Assistant Examiner*—Jennifer L. Norton
(74) *Attorney, Agent, or Firm*—Brinks Hofer Gilson & Lione

(57) ABSTRACT

A haptic input apparatus includes: a supporting member having a spherical bearing; a lever handle having a spherical portion to be supported by the spherical bearing; an electromagnetic coil arranged opposite to a lower end surface of the lever handle; detection means for detecting an operating state of the lever handle; and control means for taking in an output signal a from the detection means to output a driving signal b of the electromagnetic coil based on the output signal a. The control means reads outs a control signal c from the electromagnetic coil corresponding to an output signal a to be inputted from the detection means from a first storage to output to a first driver circuit. The first driver circuit D/A converts the control signal c outputted from the CPU for amplifying, and outputs a driving signal b from the electromagnetic coil.

5 Claims, 5 Drawing Sheets

U.S. PATENT DOCUMENTS

| | | | | | |
|---|---|---|---|---|---|
| 5,882,206 | A * | 3/1999 | Gillio | 434/262 |
| 6,104,382 | A * | 8/2000 | Martin et al. | 345/161 |
| 6,177,640 | B1 * | 1/2001 | Okabe et al. | 200/6 A |
| 6,437,770 | B1 * | 8/2002 | Venema et al. | 345/156 |
| 6,483,499 | B1 * | 11/2002 | Li et al. | 345/179 |
| 6,501,458 | B2 * | 12/2002 | Baker et al. | 345/161 |
| 6,563,487 | B2 * | 5/2003 | Martin et al. | 345/156 |
| 6,641,480 | B2 * | 11/2003 | Murzanski et al. | 463/38 |
| 6,664,666 | B2 * | 12/2003 | Corcoran | 310/12 |
| 6,781,569 | B1 * | 8/2004 | Gregorio et al. | 345/157 |
| 7,038,667 | B1 * | 5/2006 | Vassallo et al. | 345/184 |
| 2003/0057909 | A1 * | 3/2003 | Tsukui et al. | 318/566 |
| 2004/0231434 | A1 * | 11/2004 | Shibazaki et al. | 73/862.08 |
| 2005/0017947 | A1 * | 1/2005 | Shahoian et al. | 345/156 |
| 2005/0162389 | A1 * | 7/2005 | Obermeyer et al. | 345/161 |
| 2005/0231313 | A1 * | 10/2005 | Shahoian et al. | 335/220 |

FOREIGN PATENT DOCUMENTS

| | | |
|---|---|---|
| EP | 0 628 976 | 12/1994 |
| FR | 2 575 845 | 7/1986 |
| WO | 01 65328 | 9/2001 |

* cited by examiner

LEVER HANDLE TYPE HAPTIC INPUT APPARATUS EQUIPPED WITH ELECTROMAGNETIC BRAKE

BACKGROUND OF THE INVENTION

1. Field of the Invention

The present invention relates to a haptic input apparatus with an operating feeling imparting function, and more particularly to operating feeling imparting means for a lever handle type haptic input apparatus.

2. Description of the Prior Art

Conventionally, there has been proposed a haptic input apparatus which remote-controls an automotive steering system and a gear shift unit, and electric equipment such as an air conditioner, a radio, a television, a CD player and a car navigation system which are mounted onto the automobile by operating a knob arranged in the driver's cab. Also, as this sort of haptic input apparatus, in order to be able to reliably operate the knob in operating a desired device or electric equipment, there has also been conventionally proposed an apparatus which imparts a peculiar operating feeling to the knob in accordance with a direction of operating the knob or the operating position.

As the knob, there have conventionally been used, in addition to a rotary knob for rotationally operating a rotation shaft, a lever handle for exclusive use in rocking for only rocking a rocking shaft, a rocking lever handle with a rotation function for rotationally operating the rocking shaft as well as rocking it, and the like. In the present specification, the lever handle for exclusive use in rocking and the rocking lever handle with a rotation function are collectively called "lever handle".

As the haptic input apparatus with an operating feeling imparting function equipped with a lever handle, there is proposed a haptic input apparatus, including: as exemplified in FIG. 5A, a rotation shaft 102 rotatively supported by a supporting member 101; a lever handle 103 fixed to the rotation shaft 102; a rotary motor (actuator) 104 whose main spindle is directly coupled to the rotation shaft 102; and an encoder (detection means) 105 whose main spindle is directly coupled to the main spindle of the rotary motor 104, wherein a rocking motion of the lever handle 103 is converted into a rotary motion of the rotation shaft 102 to detect an amount of rocking and a rocking direction of the lever handle 103 by means of the encoder 105, a driving signal corresponding to the amount of rocking and the rocking direction thus detected drives the rotary motor 104 to impart a desired operating feeling to the lever handle 103. In this respect, in FIG. 5A, the description has been made of a structure in which the lever handle 103 is made rockable only in one direction as an example, but as regards a type in which the lever handle 103 is made rockable in any direction, two sets of supporting members 101 and a rotation shaft 102 are required.

Also, as exemplified in FIG. 5B, there has been proposed a haptic input apparatus, including: a lever handle 103 rockably supported by a supporting member 101; a solenoid (actuator) 106; a variable resistor (detection means) 107; a link 108 whose both ends are pin-connected to main spindles of the lever handle 103 and the solenoid 106 respectively; and a coupling member 109 for coupling the lever handle 103 with the operating unit of the variable resistor 107, wherein a rocking motion of the lever handle 103 is converted into a linear motion of the coupling member 109 to detect an amount of rocking and a rocking direction of the lever handle 103 by means of the variable resistor 107, a driving signal corresponding to the amount of rocking and the rocking direction thus detected drives the solenoid 106 to impart a desired operating feeling to the lever handle 103. In this respect, in FIG. 5B, the description has been made of a structure in which the lever handle 103 is made rockable only in one direction as an example, but as regards a type in which the lever handle 103 is made rockable in any direction, two sets of variable resistors 107 and the coupling members 109 are required.

As described above, since the conventional haptic input apparatus with an operating feeling imparting function equipped with a lever handle requires, as indispensable components, the rotation shaft 102 for converting the rocking motion of the lever handle 103 into the rotary motion and the link 108 and the coupling member 109 for converting the rocking motion of the lever handle 103 into the linear motion, there is a disadvantage that the structure becomes more complicated than the haptic input apparatus with an operating feeling imparting function equipped with a rotary knob, and the haptic input apparatus becomes large in size and the cost is increased.

SUMMARY OF THE INVENTION

The present invention has been achieved in order to eliminate such defectiveness of the prior art, and is aimed to provide a small-sized and low-priced haptic input apparatus with an operating feeling imparting function equipped with a lever handle.

In order to solve the problem, there is provided a haptic input apparatus according to the present invention, including: a lever handle for an operator to operate manually; a support of the lever handle; an actuator arranged opposite to the end surface of the lever handle for directly applying an external force to the lever handle; detection means for detecting an operating state of the lever handle; and control means for controlling driving of the actuator on the basis of an output signal from the detection means.

When there is provided an actuator arranged opposite to the end surface of the lever handle for directly applying an external force to the lever handle as described above, it is possible to omit a rotation shaft for converting the rocking motion of the lever handle into the rotary motion and a link and the like for converting the rocking motion of the lever handle into the linear motion. Therefore, it is possible to simplify the structure of the haptic input apparatus with an operating feeling imparting function equipped with the lever handle, and to miniaturize this sort of haptic input apparatus at low cost.

In order to solve the problem, there is provided a haptic input apparatus according to the present invention, constructed such that an amount of rocking and a rocking direction of the lever handle with respect to the support and an amount of rotation and a direction of rotation of the lever handle with respect to the support are detected by the detection means, and on the basis of an output signal from the detection means corresponding to the amount of rocking and the rocking direction of the lever handle and the amount of rotation and the direction of rotation, driving of the actuator is controlled.

When both the amount of rocking and rocking direction of the lever handle for the support and the amount of rotation and direction of rotation of the lever handle for the support are detected by the detection means as described above, as well as on the basis of an output signal from the detection means corresponding to the amount of rocking and rocking direction of the lever handle and the amount of rotation and direction of rotation, the driving of the actuator is controlled, it is possible, by operating one lever handle, to obtain a control signal of an unit to be operated corresponding to the amount of rocking and rocking direction of the lever handle and a control signal of the unit to be operated corresponding to the amount of rotation and direction of rotation of the lever handle. Therefore, it is possible to provide multifunction to the haptic input apparatus with an operating feeling imparting function equipped with a lever handle.

In order to solve the problem, there is provided a haptic input apparatus according to the present invention, constructed such that between the support and the lever handle, there is provided an elastic member for automatically returning the lever handle to the center position set in the support.

If between the support and the lever handle, there is provided an elastic member for returning to the center as described above, the lever handle can be automatically returned to the center position by means of the elastic force of the elastic member when the operator moves his hands off the lever handle. Therefore, it is possible to obtain a haptic input apparatus with a center returning function in a simple structure.

In order to solve the problem, there is provided a haptic input apparatus according to the present invention, constructed such that as the actuator, there is used an electromagnetic brake.

When as the actuator, there is used an electromagnetic brake as described above, an external force can be directly applied to the lever handle only by arranging an electromagnetic coil opposite to the end surface of the lever handle with ferromagnetism imparted. Therefore, it is possible to simplify the structure of the haptic input apparatus with an operating feeling imparting function equipped with a lever handle, and to miniaturize this sort of haptic input apparatus at low cost.

In order to solve the problem, there is provided a haptic input apparatus according to the present invention, constructed such that as the actuator, there is used an off-brake type electromagnetic brake for applying an external force to the lever handle during non-energization.

When there is used an off-brake type electromagnetic brake in which an external force is applied to the lever handle during non-energization as described above, it is possible to reduce the power consumption of the haptic input apparatus because the electromagnetic brake can be energized only when the lever handle is operated.

In order to solve the problem, there is provided a haptic input apparatus according to the present invention, constructed such that as the detection means, there is used a non-contact type optical position sensor for irradiating the end surface of the lever handle with detection light to detect reflected light from the end surface of the lever handle, and for detecting an operating position and an operating direction of the lever handle, and that the non-contact type optical position sensor is arranged opposite to the end surface of the lever handle.

When as detection means for detecting the amount of rocking and rocking direction of the lever handle and the amount of rotation and direction of rotation, the non-contact type optical position sensor is used as described above, a mechanism for converting the rocking motion of the lever handle into the rotary motion or linear motion is not required as in the case where an encoder or a variable resistor is used. Therefore, the structure of the haptic input apparatus with an operating feeling imparting function equipped with a lever handle can be further simplified.

DETAILED DESCRIPTION OF THE PREFERRED EMBODIMENTS

Figure 1:
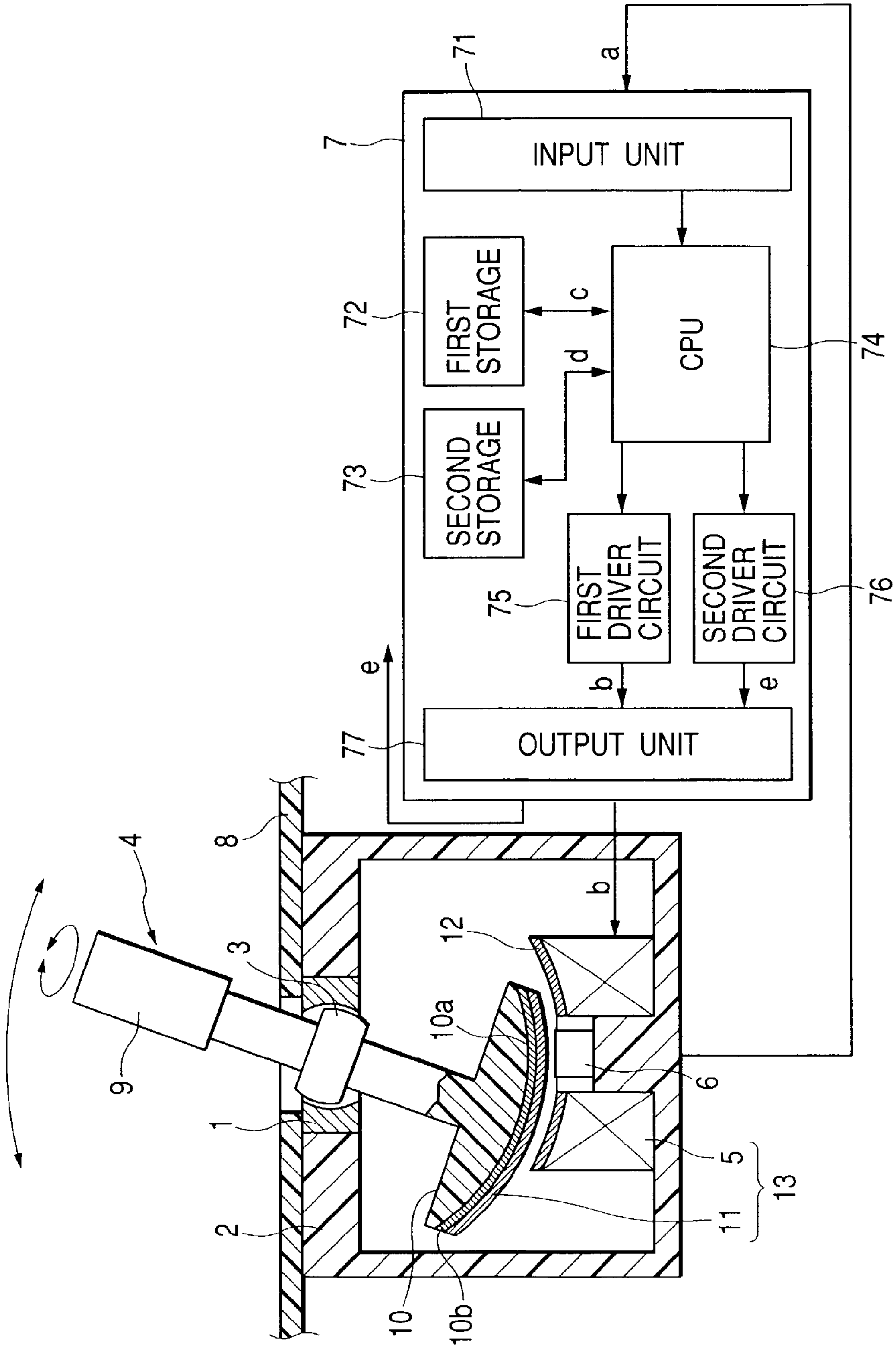
FIG. 1 is a structural view showing a haptic input apparatus according to a first embodiment.
Figure 2A:
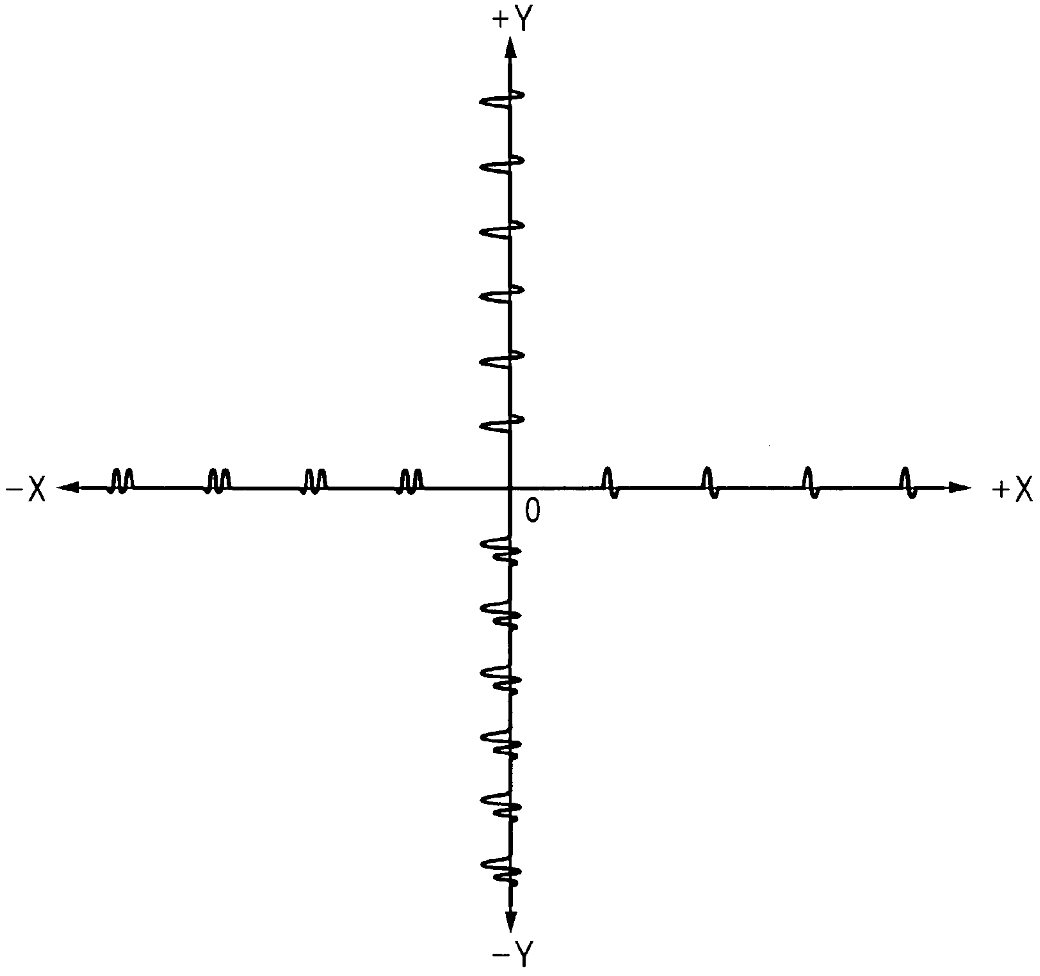
FIG. 2A is a waveform view exemplifying an external force to be applied to a lever handle of the haptic input apparatus according to the first embodiment.
Figure 2B:
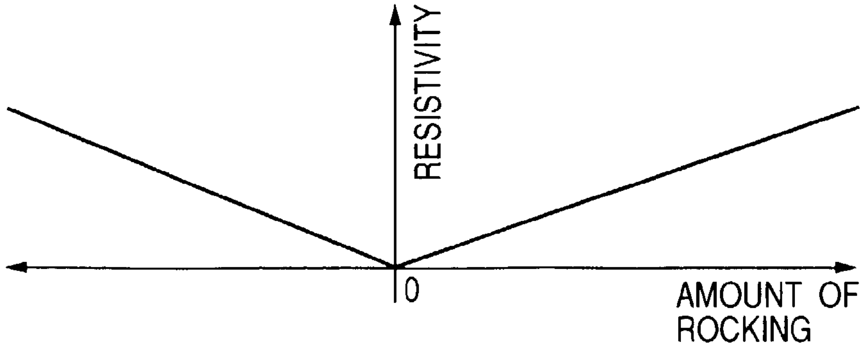
FIG. 2B is a graphical view exemplifying an external force to be applied to the lever handle of the haptic input apparatus when rotationally operated around an axis.

Hereinafter, with reference to FIGS. 1, 2A and, 2B, the description will be made of a first embodiment of a haptic input apparatus according to the present invention. FIG. 1 is a structural view showing a haptic input apparatus according to the first embodiment. FIG. 2A is a waveform view exemplifying an external force to be applied to the lever handle, and FIG. 2B is a graphical view exemplifying an external force to be applied to the lever handle of the haptic input apparatus when rotationally operated around an axis.

As shown in FIG. 1, a haptic input apparatus according to the present embodiment includes: a supporting member 2 having a spherical bearing 1; a lever handle 4 having a spherical portion 3 to be supported by the spherical bearing 1; an electromagnetic coil 5 arranged opposite to the lower end surface of the lever handle 4; detection means 6 for detecting an operating state of the lever handle 4; and control means 7 for taking in an output signal a from the detection means 6 to output a driving signal b of the electromagnetic coil 5 based on the output signal a. When this haptic input apparatus is applied as remote control for an automotive steering system or a gear shift unit or various kinds of electric equipment mounted on the automobile, the supporting member 2 is set up inside a panel 8 constituting an automotive dash board, console box and the like, and a grasp portion 9 formed in the upper part of the lever handle 4 is set up outside of the panel 8.

The spherical portion 3 is formed in the substantially central portion of the lever handle 4, and the spherical portion 3 is supported by the spherical bearing 1, whereby the lever handle 4 is rockably and rotationally mounted to the supporting member 2. Also, at the lower end portion of the lever handle 4, there is formed a substantially hemispherical external force receiving portion 10, and on a spherical surface 10*a*, which is a lower end surface of the external force receiving portion 10, there is provided a magnetic plate 11 through a leaf spring 10*b*.

The electromagnetic coil 5 and lining material 12 provided on the upper surface thereof cooperate with the magnetic plate 11 provided on the spherical surface 10*a* to constitute an electromagnetic brake 13 for applying an external force to the lever handle 4.

As the detection means 6, any well-known position sensor can be used. Since, however, the amount of rocking and rocking direction of the lever handle 4 and the amount of rotation and direction of rotation can be detected without contact, there is less variation with time in characteristics due to contamination and wear, and a mechanism for converting the rocking motion of the lever handle 4 into the rotary motion or linear motion is not required as in the case where an encoder or a variable resistor is used, it is particularly preferable to use a non-contact type optical position sensor which irradiates the surface of the lining material 12 with detection light to detect reflected light from the surface of the lining material 12 for detecting the operating position and the direction of operation of the lever handle 4.

The control means 7 includes: as shown in FIG. 1, an input unit 71 for inputting an output signal a from the detection means 6; a first storage 72 in which a control signal c of the electromagnetic coil 5 corresponding to the output signal a has been stored in the form of a table; a second storage 73 in which a control signal d of an unit to be operated corresponding to the output signal a has been stored in the form of a table; a CPU 74 for reading out a control signal c of the electromagnetic coil 5 corresponding to the output signal a from the detection means 6 inputted into the input unit 71 and a control signal d of the unit to be operated from the first storage 72 and the second storage 73 respectively for outputting; a first driver circuit 75 for D/A converting the control signal c outputted from the CPU 74 for amplifying to generate a driving signal b of the electromagnetic coil 5; a second driver circuit 76 for D/A converting a control signal d outputted from the CPU 74 for amplifying to generate a driving signal e of the unit to be operated; and an output unit 77 for outputting a driving signal b of the electromagnetic coil 5 and a driving signal e of the unit to be operated.

The first storage 72 is capable of storing any external force table in accordance with a type of the unit to be operated through the use of the lever handle 4 and a type of a function to be adjusted. FIG. 2A is a view exemplifying an external force to be applied to the lever handle 4 when the lever handle 4 is rock-operated from a center position (position at which the lever handle 4 is in an upright position) to four directions: +X, −X, +Y, and −Y, exemplifying a case where different click feelings are given to the lever handle 4 in accordance with each of the rocking directions. Also, FIG. 2B is a view exemplifying the external force to be applied to the lever handle 4 when the lever handle 4 is rotationally operated around the axis A-A of the lever handle 4, exemplifying a case where a feeling of resistance that varies in intensity depending upon the amount of rotation is applied to the lever handle 4. The operator perceives this feeling of click or feeling of resistance, whereby the operator can learn by blind touch whether or not the lever handle 4 is being rock-operated in an intended direction, or whether or not the lever handle 4 has been rotationally operated by the intended amount of rotation. Therefore, it is possible to improve the operability of the haptic input apparatus. In this respect, when the lever handle 4 is rock-operated in any oblique direction other than the +X direction, −X direction, +Y direction, and −Y direction, it is possible not to output a driving signal b to the electromagnetic coil 5, not to apply any external force to the lever handle 4, or possible to output a driving signal b to the electromagnetic coil 5 applying an external force to lock the lever handle 4.

In a haptic input apparatus according to the present embodiment, as an actuator for applying an external force to the lever handle 4, there is provided an electromagnetic brake 13 made up of a magnetic plate 11 provided on the lower end surface of the lever handle 4, a lining material 12 arranged opposite to the magnetic plate 11, and an electromagnetic coil 5 so as to apply an external force to the lever handle 4 through a leaf spring 10*b* and magnetic material 11. Therefore, it is possible to omit the rotation shaft for converting the rocking motion of the lever handle into the rotary motion and the link and the like for converting the rocking motion of the lever handle into the linear motion, to simplify the structure of the haptic input apparatus with an operating feeling imparting function equipped with the lever handle 4, and to miniaturize this sort of haptic input apparatus at low cost. Also, in the haptic input apparatus according to the present embodiment, since both the amount of rocking and rocking direction of the lever handle 4 for the supporting member 2 and the amount of rotation and direction of rotation of the lever handle 4 for the supporting member 2 are detected by the detection means 6, as well as on the basis of an output signal from the detection means corresponding to the amount of rocking and rocking direction of the lever handle 4 and the amount of rotation and direction of rotation, the driving of the electromagnetic coil 5 is controlled, it is possible, by operating one lever handle 4, to obtain a control signal of an unit to be operated corresponding to the amount of rocking and rocking direction of the lever handle 4 and a control signal of the unit to be operated corresponding to the amount of rotation and direction of rotation of the lever handle 4. Therefore, it is possible to provide multifunction to the haptic input apparatus with an operating feeling imparting function equipped with the lever handle 4.

Figure 3:
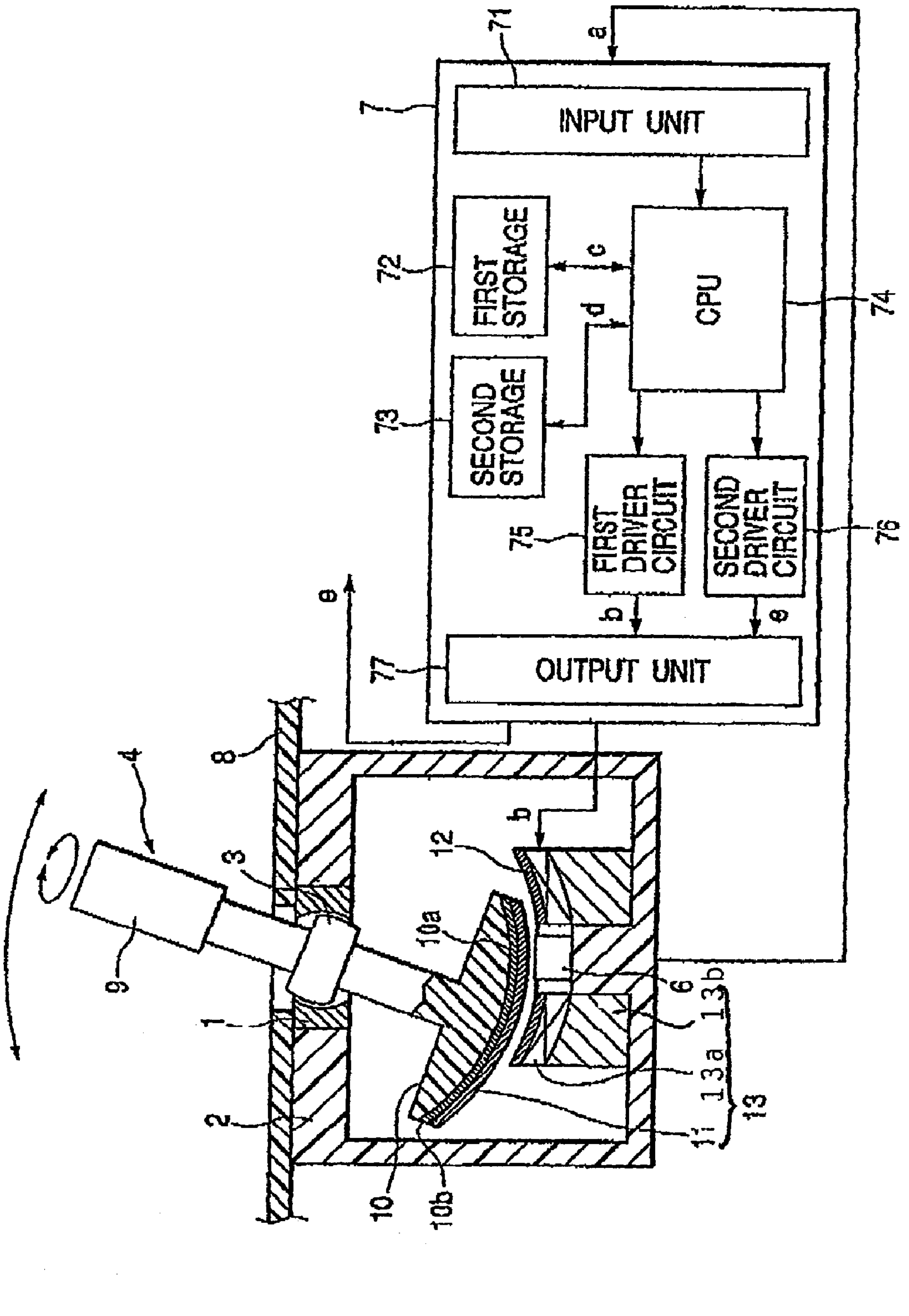
FIG. 3 is a structural view showing a haptic input apparatus according to a second embodiment.

Next, with reference to FIG. 3, the description will be made of a haptic input apparatus according to a second embodiment of the present invention. FIG. 3 is a structural view showing a haptic input apparatus according to the second embodiment.

As shown in FIG. 3, the haptic input apparatus according to the present embodiment is characterized by the fact that the electromagnetic brake 13 is formed of an electromagnetic coil 13*a*, a permanent magnet 13*b* arranged below the electromagnetic coil 13*a*, and a magnetic plate 11 mounted to the spherical portion 3, and that when the electromagnetic coil 13*a* is not energized, the magnetic plate 11 is attracted under the action of the permanent magnet 13*b* and an off-brake type electromagnetic brake for applying an external force to the lever handle 4 is used. As regards other portions, since they are the same as in the haptic input apparatus according to the first embodiment, corresponding portions are designated by the identical reference numerals, and description thereof will be omitted.

The haptic input apparatus according to the present embodiment has similar effects to the haptic input apparatus according to the first embodiment, and in addition, as the electromagnetic brake 13, an off-brake type electromagnetic brake which applies an external force to the lever handle 4 when not energized has been used. Therefore, only when the lever handle 4 is operated, the electromagnetic coil 5 can be energized, and this leads to the effect that the power consumption of the haptic input apparatus can be reduced.

Figure 4:
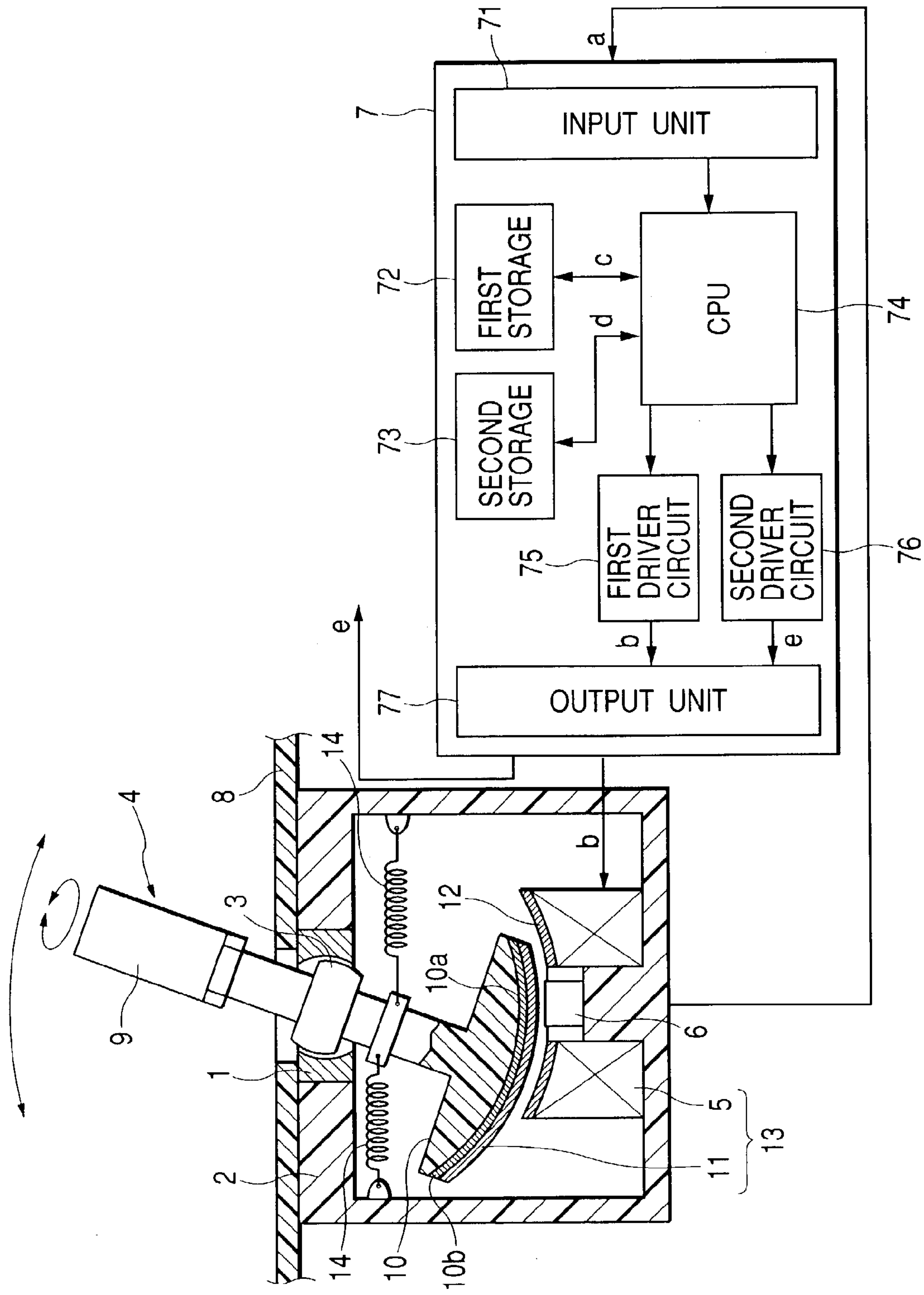
FIG. 4 is a structural view showing a haptic input apparatus according to a third embodiment.
Figure 5A:
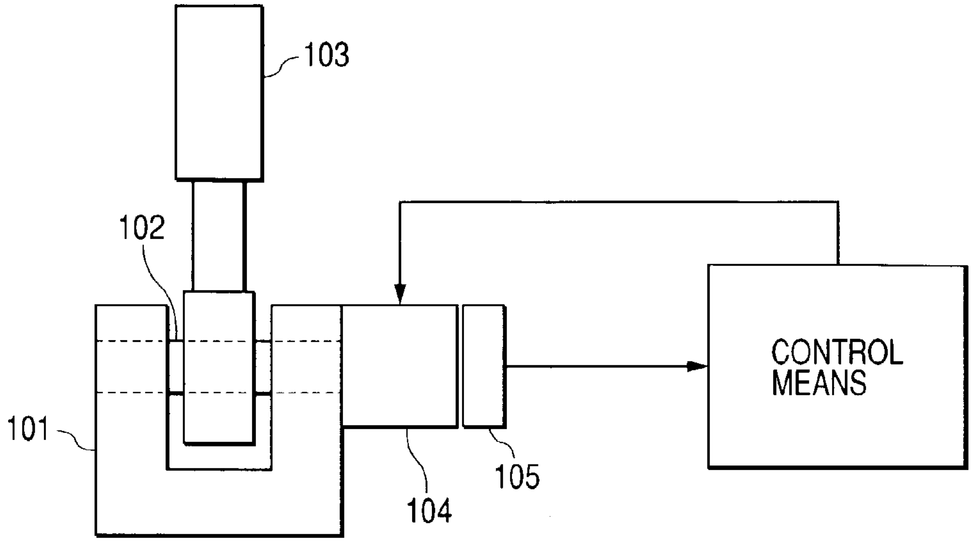
FIG. 5A PRIOR ART
FIG. 5 is a structural view showing a haptic input apparatus according to the prior art.
Figure 5B:
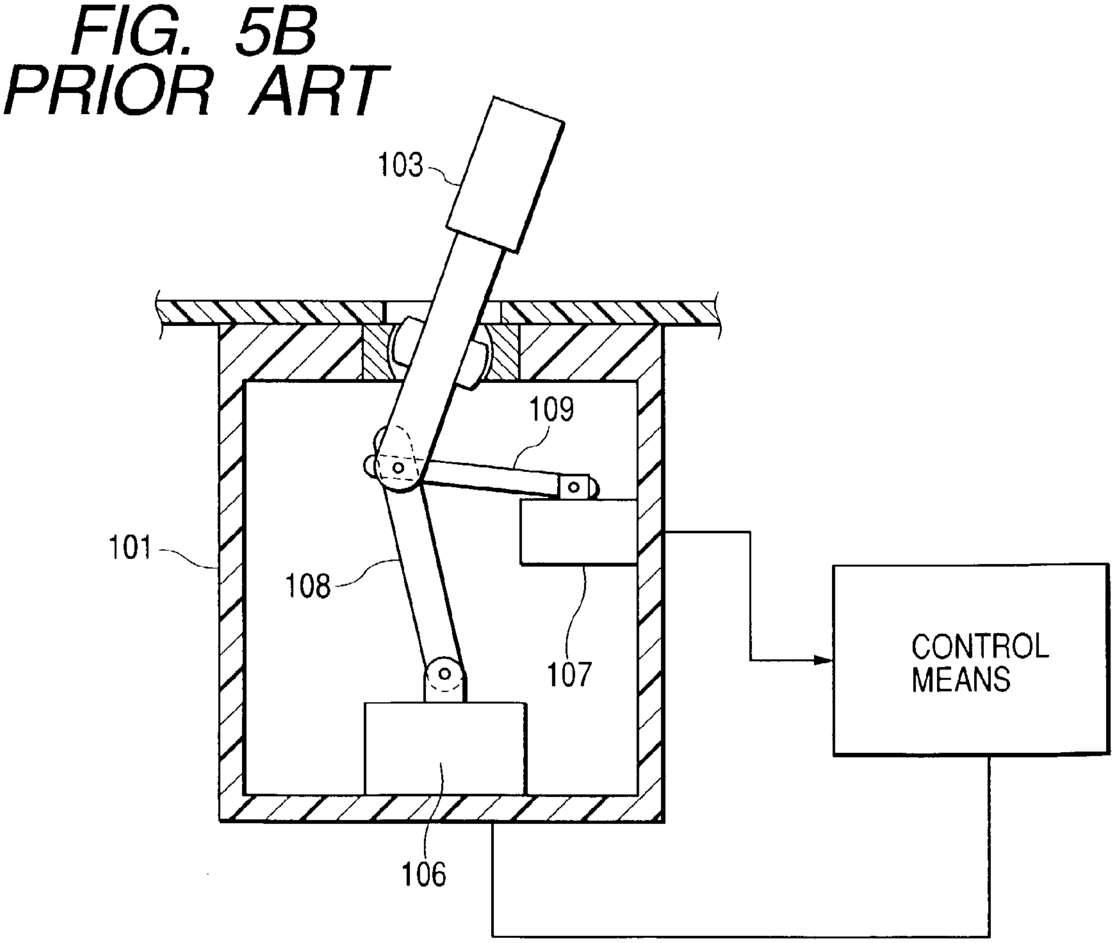
FIG. 5B PRIOR ART

Next, with reference to FIG. 4, the description will be made of a haptic input apparatus according to a third embodiment of the present invention. FIG. 4 is a structural view showing a haptic input apparatus according to the third embodiment.

As shown in FIG. 4, the haptic input apparatus according to the present embodiment is characterized by the fact that between the supporting member 2 and the lever handle 4 of the haptic input apparatus according to the first embodiment, there is provided an elastic member 14 for automatically returning the lever handle 4 to the center position. As regards other portions, since they are the same as in the haptic input apparatus according to the first embodiment, corresponding portions are designated by the identical reference numerals, and description thereof will be omitted.

The haptic input apparatus according to the present embodiment has similar effects to the haptic input apparatus according to the first embodiment, and in addition, since there has been provided the elastic member 14 for returning to the center, the lever handle 4 can be automatically returned to the center position by means of the elastic force of the elastic member 14 when the operator moves his hands off the lever handle 4. It is possible to obtain a haptic input apparatus with a center returning function in a simple structure.

In this respect, in each of the above-described embodiments, the description has been made of a case where the haptic input apparatus is applied as remote control for an automotive steering system, a gear shift unit, or on-board electric equipment as an example, but the gist of the present invention is not limited thereto and can be applied as remote control for any other unit to be operated.

As described above, in the haptic input apparatus according to the present invention, since as the actuator, there has been provided a device which is arranged opposite to the end surface of the lever handle and directly applies an external force to the lever handle, it is possible to omit a rotation shaft for converting the rocking motion of the lever handle into the rotary motion, and the link and the like for converting the rocking motion of the lever handle into the linear motion, to simplify the structure of the haptic input apparatus with an operating feeling imparting function equipped with the lever handle, and to miniaturize this sort of haptic input apparatus at low cost.

What is claimed is:

1. A haptic input apparatus, comprising:

a lever handle for an operator to operate manually;

a support of the lever handle;

an electromagnetic brake comprising a magnetic plate provided on a lower end portion of the lever handle through a leaf spring, and a lining material and an electromagnetic coil arranged opposite to the lower end portion of the lever handle, that directly applies an external force to the lever handle;

a detector that detects an operating state of the lever handle; and a controller that controls driving of the electromagnetic brake on the basis of an output signal from the detector.

2. The haptic input apparatus according to claim 1, wherein an amount of rocking and a rocking direction of the lever handle with respect to the support and an amount of rotation and a direction of rotation of the lever handle with respect to the support are detected by the detector, and wherein on the basis of an output signal from the detector corresponding to the amount of rocking and the rocking direction of the lever handle and the amount of rotation and the direction of rotation, driving of the electromagnetic brake is controlled.

3. The haptic input apparatus according to claim 1, wherein between the support and the lever handle, there is provided an elastic member that automatically returns the lever handle to a center position set in the support.

4. The haptic input apparatus according to claim 1, wherein the electromagnetic brake is an off-brake type electromagnetic brake that applies an external force to the lever handle during non-energization of the electromagnetic coil.

5. The haptic input apparatus according to claim 1, wherein as the detector, there is used a non-contact type optical position sensor that irradiates an end surface of the lever handle with detection light to detect reflected light from the end surface of the lever handle, and that detects an operating position and an operating direction of the lever handle, and wherein the non-contact type optical position sensor is arranged opposite to the end surface of the lever handle.

* * * * *